United States Patent
Sakai

(10) Patent No.: US 9,513,633 B2
(45) Date of Patent: *Dec. 6, 2016

(54) WORK VEHICLE AND CONTROL METHOD FOR WORK VEHICLE

(71) Applicant: Komatsu Ltd., Tokyo (JP)

(72) Inventor: Katsuyuki Sakai, Naka-gun (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/646,843

(22) PCT Filed: Jul. 30, 2014

(86) PCT No.: PCT/JP2014/070077
§ 371 (c)(1),
(2) Date: May 22, 2015

(87) PCT Pub. No.: WO2015/033709
PCT Pub. Date: Mar. 12, 2015

(65) Prior Publication Data
US 2016/0033968 A1 Feb. 4, 2016

(51) Int. Cl.
*G05D 1/02* (2006.01)
*G08C 17/02* (2006.01)

(52) U.S. Cl.
CPC ............... *G05D 1/021* (2013.01); *G08C 17/02* (2013.01); *G05D 2201/02* (2013.01)

(58) Field of Classification Search
CPC ...... G05D 2201/02; G05D 1/021; G08C 17/02
See application file for complete search history.

(56) References Cited

U.S. PATENT DOCUMENTS

| | | | | |
|---|---|---|---|---|
| 6,633,800 | B1 * | 10/2003 | Ward | B60W 50/02 180/167 |
| 8,555,660 | B2 | 10/2013 | Takenaka et al. | |
| 2002/0099481 | A1 | 7/2002 | Mori | |

FOREIGN PATENT DOCUMENTS

| | | | |
|---|---|---|---|
| JP | 2002-180502 | A | 6/2002 |
| JP | 2002-215236 | A | 7/2002 |
| JP | 2004-348319 | A | 12/2004 |
| JP | 2008-184979 | A | 8/2008 |
| JP | 2008184979 | A * | 8/2008 |
| JP | 2008-265704 | A | 11/2008 |
| JP | 2009-118113 | A | 5/2009 |

OTHER PUBLICATIONS

International Search Report mailed Sep. 22, 2014, issued for PCT/JP2014/070077.

* cited by examiner

*Primary Examiner* — Yuen Wong
(74) *Attorney, Agent, or Firm* — Locke Lord LLP

(57) ABSTRACT

The present invention provides a work vehicle including a control system that can switch between a first driving mode for allowing the work vehicle to travel in a manned state and a second driving mode for allowing the work vehicle to travel in an unmanned state, wherein the control system controls such that, during an execution of the second driving mode, a number of types of information exchanged by communication in the control system becomes less than that during the first driving mode, or a communication interval of information exchanged by the communication in the control system becomes longer than that during the first driving mode.

5 Claims, 4 Drawing Sheets

WORK VEHICLE AND CONTROL METHOD FOR WORK VEHICLE

FIELD

The present invention relates to a work vehicle and a control method for a work vehicle.

BACKGROUND

Recently, it has been proposed to allow a work vehicle to automatically travel in an unmanned state on a preset traveling route in, for example, a mine (for example, Patent Literature 1). In the work vehicle used for this purpose, information necessary for allowing the work vehicle to travel in an unmanned state is exchanged among various control devices in the work vehicle via a communication line in the work vehicle. For example, as a technique of reducing a communication load, there has been proposed a technique in which information concerning a working machine is transmitted to an abnormality determination processing unit from an information collecting unit with a longer transmission interval in a period in which a probability of an occurrence of abnormality in the working machine is smaller, based on a relationship between the probability of the occurrence of abnormality and a lapse of time (for example, Patent Literature 2.)

CITATION LIST

Patent Literature

Patent Literature 1: Japanese Unexamined Patent Publication No. 2002-215236
Patent Literature 2: Japanese Unexamined Patent Publication No. 2002-180502

SUMMARY

Technical Problem

Some unmanned and automatically-traveling work vehicles include not only an unmanned traveling mode but also a manned traveling mode. The work vehicle described above presents information necessary for an operation by an operator in the manned traveling mode. However, this information is unnecessary in the unmanned traveling mode. When the information necessary for the operation by the operator is received or transmitted by communication in the work vehicle in the unmanned traveling mode, communication is likely to be concentrated on a communication line in the work vehicle. In the technique described in the Patent Literature 2, communication is restricted depending upon a vehicle-body operating time, whether the work vehicle travels in the manned traveling mode or in the unmanned traveling mode. Therefore, communication is likely to be concentrated on the communication line, when the work vehicle travels in the unmanned traveling mode.

The present invention aims to prevent an occurrence of concentration of communication on a communication line, when a work vehicle having an unmanned traveling mode and a manned traveling mode travels in the unmanned traveling mode.

Solution to Problem

According to the present invention, a work vehicle comprises a control system that can switch between a first driving mode for allowing the work vehicle to travel in a manned state and a second driving mode for allowing the work vehicle to travel in an unmanned state, wherein the control system controls such that, during an execution of the second driving mode, a number of types of information exchanged by communication in the control system becomes less than that during the first driving mode, or a communication interval of information exchanged by the communication in the control system becomes longer than that during the first driving mode.

In the present invention, it is preferable that the control system includes a communication device that is provided to the work vehicle to acquire information through communication with an outside of the work vehicle, a first control system that allows the work vehicle to travel in the first driving mode based on an operation by an operator boarding the work vehicle, a second control system that generates a control instruction to control the work vehicle based on the information acquired from the communication device, and transmits the control instruction to the first control system to allow the work vehicle to travel in the second driving mode via the first control system, and a communication line used for a communication between the first control system and the second control system.

In the present invention, it is preferable that the control system stops an exchange of information presented to the operator and information for control to restrict an operation by the operator, out of information pieces exchanged by communication in the first control system, during the execution of the second driving mode.

In the present invention, it is preferable that the control system determines a situation in which a number of types of information exchanged by the communication in the first control system is reduced as an abnormal situation during an execution of the first driving mode, and the control system does not determine a situation in which a number of types of information exchanged by the communication in the first control system is reduced as an abnormal situation during the execution of the second driving mode.

In the present invention, it is preferable that the control system controls such that, during the execution of the second driving mode, a communication interval of information presented to the operator and information for control to restrict an operation by the operator, out of the information pieces exchanged by communication in the first control system, becomes longer than that during the first driving mode.

According to the present invention, a control method for a work vehicle provided with a control system that can switch between a first driving mode for allowing the work vehicle to travel in a manned state and a second driving mode for allowing the work vehicle to travel in an unmanned state, the method comprises: controlling such that, during an execution of the second driving mode, a number of types of information exchanged by communication in the control system becomes less than that during the first driving mode, or a communication interval of information exchanged by the communication in the control system becomes longer than that during the first driving mode.

In the present invention, it is preferable that the control system includes a communication device that is provided to the work vehicle to acquire information through communication with an outside of the work vehicle, a first control system that allows the work vehicle to travel in the first driving mode based on an operation by an operator boarding the work vehicle, a second control system that generates a control instruction to control the work vehicle based on the information acquired from the communication device, and transmits the control instruction to the first control system to allow the work vehicle to travel in the second driving mode via the first control system, and a communication system used for a communication between the first control system and the second control system.

The present invention can prevent an occurrence of concentration of communication on a communication line, when a work vehicle having an unmanned traveling mode and a manned traveling mode travels in the unmanned traveling mode.

DESCRIPTION OF EMBODIMENTS

An embodiment for embodying the present invention (embodiment) will be described below in detail with reference to the drawings.

Figure 1:
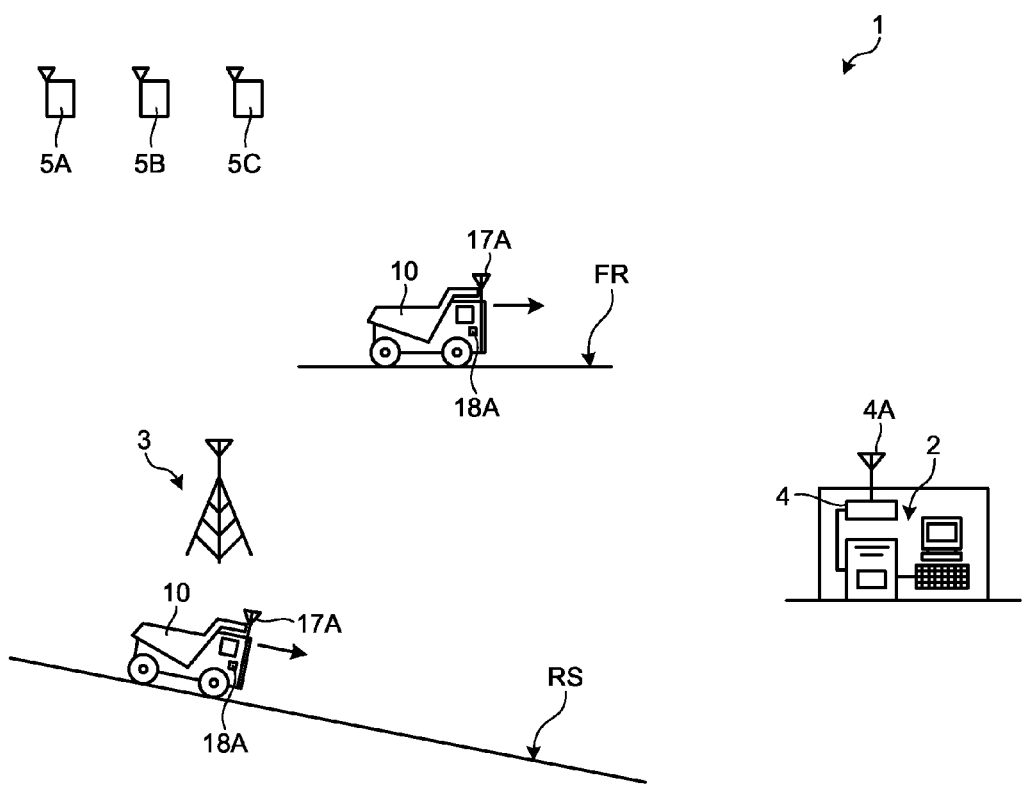
FIG. 1 is a diagram illustrating a site where a work vehicle according to the present embodiment works.

FIG. 1 is a view illustrating a site where a work vehicle according to the present embodiment works. The work vehicle according to the present embodiment is used for various works in a mine, but the work vehicle is not limited to the one used in a mine. The present embodiment describes, as the work vehicle, a dump truck 10 that serves as a transporter vehicle for carrying crushed stones, or dirt or rocks generated upon digging crushed stones. However, the work vehicle is not limited thereto. For example, the work vehicle according to the present embodiment may be a sprinkler truck that scatters water on a road, an excavator, or a wheel loader. The work vehicle according to the present embodiment may be an autonomous vehicle that autonomously generates a moving route, and moves on this moving route.

<Dump Truck in Mine>

In the present embodiment, a dump truck 10 automatically travels under control by an unmanned dump operation system 1. The unmanned dump operation system 1 includes an operation control device 2 that transmits information necessary for the automatic traveling to the dump truck 10 via a wireless communication, the information including a destination of the dump truck 10, a permission to run for each section, positional information of other vehicles, and an emergency stop command. The dump truck 10 automatically travels based on the information necessary for the automatic traveling acquired from the operation control device 2. Different from the dump truck 10 serving as a moving body, the operation control device 2 is, for example, one of control devices that are installed in a mine control center for controlling a work vehicle such as the dump truck 10 and an operation of the mine.

The operation control device 2 is connected to a wireless communication device 4 having an antenna 4A for moving the dump truck 10 working in the mine. The dump truck 10 includes an antenna 17A for receiving an instruction from the operation control device 2 or transmitting its operation information to the operation control device 2. The dump truck 10 can also receive radio waves from GPS (Global Positioning System) satellites 5A, 5B, and 5C by a GPS antenna 18A to measure its own position.

The communicable range of the radio wave output transmitted from the antenna 4A of the operation control device 2 and the antenna 17A of the dump truck 10 cannot cover the whole mine. Therefore, the unmanned dump operation system 1 includes a relay 3 that relays the radio waves transmitted from the antenna 4A and the antenna 17A. Thanks to the relay 3, the operation control device 2 can transmit a control instruction to the dump truck 10 working at a position apart from the operation control device 2, or collect the operation information from the dump truck 10. The dump truck 10 travels on a flat road FR or a sloping road RS between a soil discharge field and a loading field in a mine. The dump truck 10 will next be described.

<Dump Truck 10>

Figure 2:
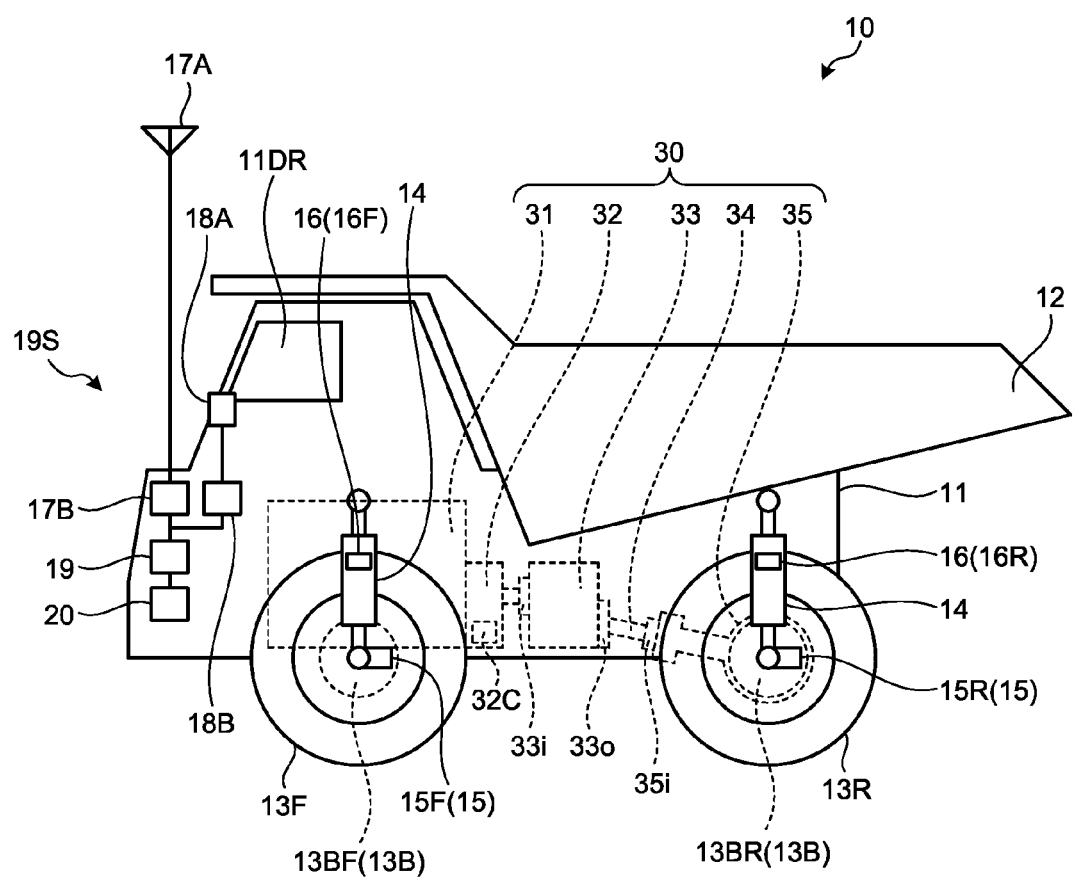
FIG. 2 is a view illustrating a dump truck according to the present embodiment.

FIG. 2 is a view illustrating the dump truck 10 according to the present embodiment. The dump truck 10 automatically works under the control by the unmanned dump operation system 1 without being operated by an operator. However, when the dump truck 10 is carried into a maintenance factory or transported from the maintenance factory, the control of the dump truck 10 by the unmanned dump operation system 1 may not be executed. In such case, the operator has to board the dump truck 10 to operate the dump truck 10. For this, the dump truck 10 has a driver's room 11DR for the operator. The driver's room 11DR includes operation devices such as a steering wheel, an accelerator pedal, and a brake pedal.

A cargo is loaded on the dump truck 10, and the loaded cargo is unloaded on a desired place. The dump truck 10 includes a body 11; a vessel 12; front wheels 13F and rear wheels 13R; a brake 13B serving as a brake device; a suspension cylinder 14; a rotation sensor 15; a suspension pressure sensor (pressure sensor) 16; an on-vehicle wireless communication device 17B to which the antenna 17A is connected; a GPS receiver 18B to which the GPS antenna 18A is connected and which serves as a position information detection device; a communication control device 19; a control system 20; and a drive device 30. The dump truck 10 also includes various mechanisms and functions of a popular transporting machine or transporting vehicle, in addition to the above devices. The present embodiment describes a rigid-type dump truck 10 having the front wheels 13F that are steered. However, the present embodiment is applicable not only to the dump truck 10 described above but alto to an articulate dump truck that includes a body divided into a front section and a rear section, which sections are connected with a free joint.

The body 11 includes the vessel 12, the front wheels 13F, the rear wheels 13R, the suspension cylinder 14, and the drive device 30. The vessel 12 functions as a pallet on which ores or dirt is loaded as a cargo. The vessel 12 is mounted on the body 11. The front wheels 13F are steering wheels that determine the advancing direction of the dump truck 10. The rear wheels 13R are drive wheels for allowing the dump truck 10 to travel. The front wheels 13F are disposed at both of right and left sides at the front of the body 11, i.e., near the driver's room 11DR. The rear wheels 13R are disposed at both of right and left sides at the rear of the body 11, i.e., at the side opposite to the driver's room 11DR.

The brake 13B includes a front-wheel brake 13BF and a rear-wheel brake 13BR. The front-wheel brake 13BF is provided to each of the front wheels 13F to stop the corresponding front wheel 13F. The rear-wheel brake 13BR is provided to each of the rear wheels 13R to stop the corresponding rear wheel 13R.

The suspension cylinder 14 is provided between the body 11 and the left and right front wheels 13F and between the body 11 and the left and right rear wheels 13R. The suspension cylinder 14 is provided to each of the left and right front wheels 13F and each of the left and right rear wheels 13R for supporting the corresponding wheel. The suspension cylinder 14 receives loads of the body 11 and the vessel 12, and the loads according to a mass of a cargo loaded on the dump truck 10. The suspension cylinder 14 contains operating oil filled therein, whereby it expands or contracts according to the mass of the cargo.

The rotation sensor 15 includes a front-wheel rotation sensor 15F that detects the rotating speed of each of the front wheels 13F and a rear-wheel rotation sensor 15R that detects the rotating speed of each of the rear wheels 13R. The front-wheel rotation sensor 15F detects the rotating speed of each of the front wheels 13F, for example, whereby the rotation sensor 15 measures a speed (referred to as a vehicle speed, as necessary) of the traveling dump truck 10. The front wheels 13F are driven wheels that are not driven by the drive device 30. Since the front wheels 13F are not driven by the drive device 30, a slippage hardly occurs between the front wheels 13F and the road surface. Therefore, the rotating speed of each of the front wheels 13F approximately corresponds to the vehicle speed of the dump truck 10.

The suspension pressure sensor 16 is provided to correspond to each of the suspension cylinders 14 provided to each of the front wheels 13F and each of the rear wheels 13R. The suspension pressure sensor 16 detects a load applied to each suspension cylinder 14. Specifically, the suspension pressure sensor 16 detects pressure of the operating oil filled in the suspension cylinder 14, thereby measuring a mass of a cargo (load capacity).

A communication device 19S includes the antenna 17A, the on-vehicle wireless communication device 17B, the GPS antenna 18A, the GPS receiver 18B, and the communication control device 19. The antenna 17A receives the radio waves outputted from the relay 3 of the operation control device 2 illustrated in FIG. 1. The antenna 17A outputs the received radio waves to the on-vehicle wireless communication device 17B. The on-vehicle wireless communication device 17B executes wireless communication via the antenna 17A, the relay 3, and the antenna 4A of the operation control device 2.

The GPS antenna 18A receives radio waves outputted from plural GPS satellites 5A, 5B, and 5C, illustrated in FIG. 1, which form a GPS (Global Positioning System). The GPS antenna 18A outputs the received radio waves to the GPS receiver 18B. The GPS receiver 18B converts the radio waves received by the GPS antenna 18A into an electric signal to calculate position information of the GPS antenna 18A, i.e., position information of the dump truck 10. In this way, the GPS receiver 18B measures the position of the dump truck 10.

The on-vehicle wireless communication device 17B and the GPS receiver 18B are connected to the communication control device 19. The communication control device 19 is connected to the control system 20. The communication control device 19 converts the information from the on-vehicle wireless communication device 17B and the GPS receiver 18B into a format that can be understood by the control system 20. The control system 20 acquires information for allowing the dump truck 10 to travel in an unmanned state from the operation control device 2 via the communication control device 19, the on-vehicle wireless communication device 17B, and the antenna 17A. The control system 20 acquires the position information of the dump truck 10 from the GPS receiver 18B.

(Drive Device 30)

The drive device 30 drives the rear wheels 13R to allow the dump truck 10 to travel. The drive device 30 includes an engine 31 serving as a power source, a torque converter 32, a transmission 33, a propeller shaft 34, and a differential gear 35. The engine 31 is a diesel engine in the present embodiment. However, the engine 31 is not limited to a diesel engine. The output from the engine 31 is transmitted to the transmission 33 via the torque converter 32. The torque converter 32 includes an input shaft to which the output from the engine 31 is inputted and an output shaft that outputs the output from the engine inputted to the input shaft. The torque converter 32 includes a lock-up clutch 32C that directly connects the input shaft and the output shaft. The transmission 33 reduces the rotating speed (engine speed per a unit time) of a crankshaft that is the output shaft of the engine 31 to increase a torque, and outputs the increased torque to the propeller shaft 34.

The propeller shaft 34 connects an output section 33o of the transmission 33 and an input section 35i of the differential gear 35. The propeller shaft 34 transmits the output from the transmission 33 to the differential gear 35. The differential gear 35 transmits the transmitted output from the transmission 33 to the left and right rear wheels 13R to drive these wheels. In this way, the drive device 30 allows the dump truck 10 to travel.

(Transmission 33)

The transmission 33 can make the rotating speed of the engine 31 inputted from an input section 33i different, in other words, change gears, and output the changed speed from the output section 33o. In the present embodiment, the transmission 33 is a power transmission device formed by combining plural planetary gear trains that transmit power from the engine 31, and plural clutches and plural brakes for selecting a rotation element in each of the planetary gear trains. The transmission 33 engages or disengages the clutch with or from the brake to change the rotation element through which the power from the engine 31 transmits, whereby plural different gear ratios can be realized. In this way, in the present embodiment, the dump truck 10 is a mechanical vehicle that travels by transmitting the power generated from the engine 31 to the rear wheels 13R via the torque converter 32, the transmission 33, the propeller shaft 34, and the differential gear 35.

<Control System 20>

Figure 3:
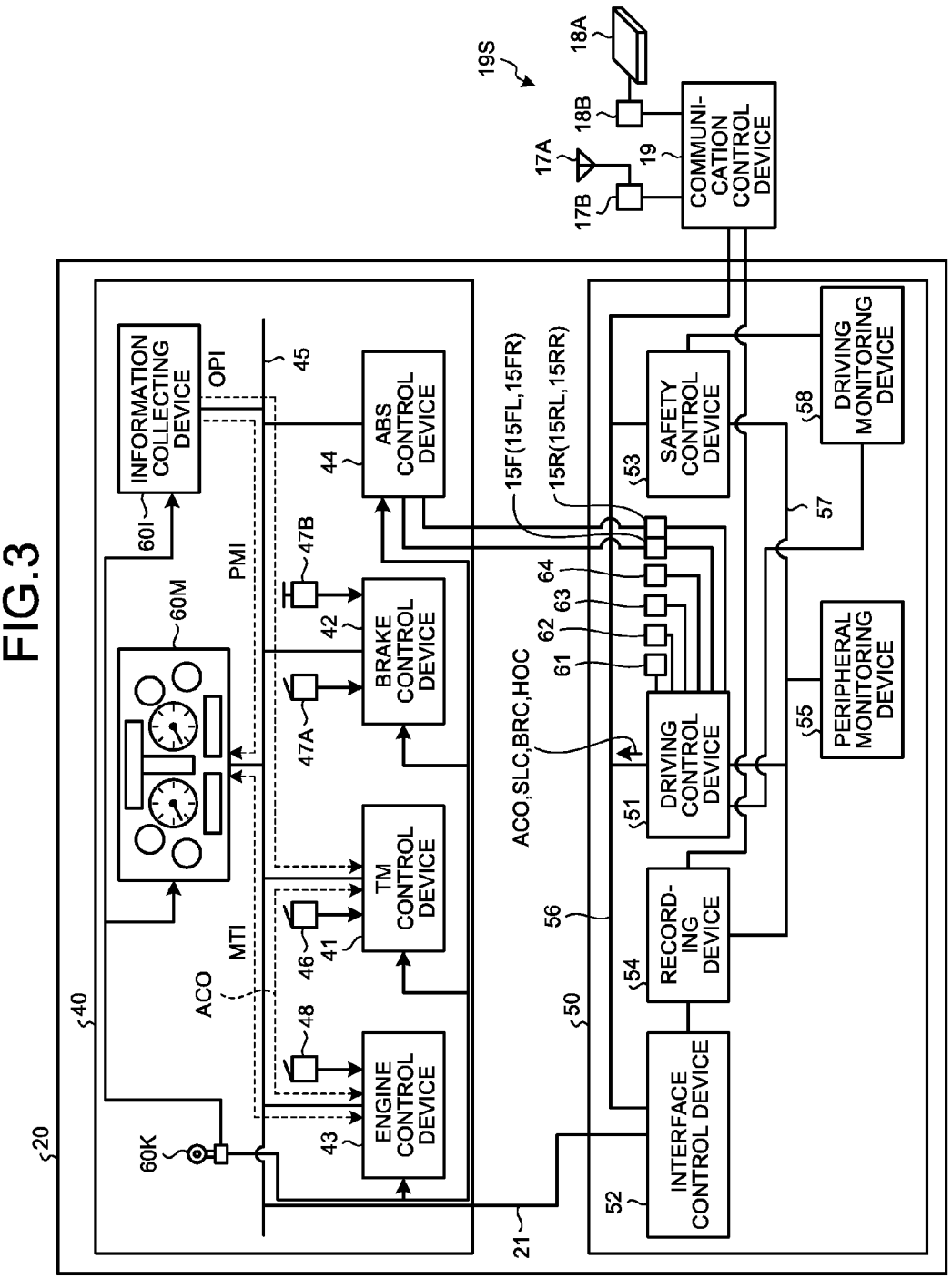
FIG. 3 is a block diagram illustrating a control system mounted in the dump truck.

FIG. 3 is a block diagram illustrating the control system 20 in the dump truck 10. The control system 20 includes a first control system 40 and a second control system 50. The first control system 40 controls the devices mounted on the dump truck 10, such as the engine 31, the transmission 33, and the brake 13B. The first control system 40 allows the dump truck 10 to travel based on the operation by the operator boarding the dump truck 10. The second control system 50 generates a control instruction controlling the dump truck 10 based on the instruction from the operation control device 2 illustrated in FIG. 1 and the information acquired from the communication device 19S. The second control system 50 transmits the generated control instruction to the first control system 40 to allow the dump truck 10 to automatically travel in the unmanned state via the first control system 40.

In the present embodiment, the driving mode for allowing the dump truck 10 to travel by the operation of the operator boarding the dump truck 10 is referred to as a first driving mode. A driving mode for allowing the dump truck 10 to travel without having the operator on the dump truck 10, e.g., for allowing the dump truck 10 to travel based on the information from the outside of the dump truck 10, is referred to as a second driving mode. The first driving mode is a driving mode for allowing the dump truck 10 to travel in a manned state, while the second driving mode is a driving mode for allowing the dump truck 10 to travel in an unmanned state. The second driving mode includes the case where the operator remotely operates an unmanned dump truck, in addition to the case where the control system 20 in the dump truck 10 allows the unmanned dump truck 10 to automatically travel.

(First Control System 40)

The first control system 40 includes a TM (transmission) control device 41, a brake control device 42, an engine control device 43, an ABS (Antilock Brake System) control device 44, a monitor 60M, an information collecting device 60I, and a key switch 60K, for example. The TM control device 41, the brake control device 42, the engine control device 43, the ABS control device 44, the monitor 60M, and the information collecting device 60I are computers including a processing unit such as a CPU (Central Processing Unit) and a storage unit such as ROM (Read Only Memory).

The TM control device 41 controls the transmission 33 and the lock-up clutch 32C in the torque converter 32 illustrated in FIG. 2. The brake control device 42 controls the brake 13B illustrated in FIG. 2. The engine control device 43 controls the engine 31 illustrated in FIG. 2. In the case where the front wheels 13F and the rear wheels 13R are locked when the brake 13B illustrated in FIG. 2 stops these wheels, the ABS control device 44 reduces the braking force of the brake 13B to unlock the front wheels 13F and the rear wheels 13R.

The information collecting device 60I acquires information relating to the status of the dump truck 10 from the TM control device 41, the brake control device 42, the engine control device 43, the ABS control device 44, and various sensors while the dump truck 10 is working, and stores the acquired information in association with the time when the information is acquired. The information in which the information relating to the status of the dump truck 10 and the time when this information is acquired are associated with each other is referred to as operation information. The information collecting device 60I transmits the operation information of the dump truck 10 to the operation control device 2 illustrated in FIG. 1 via the communication device 19S. The operation control device 2 creates a daily report or detects a failure of the dump truck 10, by using the operation information acquired from the information collecting device 60I. In the present embodiment, the dump truck may include an on-vehicle wireless communication device directly connected to an information collecting device 61I, and this information collecting device 61I may transmit the operation information to the operation control device 2 via the on-vehicle wireless communication device without using the communication device 19S.

The monitor 60M displays various information pieces of the dump truck 10. The various information pieces include, for example, a speed of the dump truck 10, i.e., the traveling speed of the dump truck 10, a temperature of cooling water in the engine 31 illustrated in FIG. 2, and various warnings. The monitor 60M displays, for example, a payload that is a load of a cargo loaded on the vessel 12 illustrated in FIG. 2 in the first driving mode. The various information pieces displayed on the monitor 60M include, for example, information (e.g., a fuel amount and a gear shift stage) necessary for the operator who drives the dump truck, when the dump truck 10 travels in the first driving mode. The key switch 60K is connected to a dedicated terminal provided to each of the TM control device 41, the brake control device 42, the engine control device 43, the ABS control device 44, the monitor 60M, and the information collecting device 60I, which devices are included in the control system 20. With this, the key switch 60K turns on or off a power source supplied to these devices, or switches between the first driving mode and the second driving mode. The control system 20 may have a switch for switching between the first driving mode and the second driving mode, in isolation from the key switch 60K.

Each of the TM control device 41, the brake control device 42, the engine control device 43, the ABS control device 44, the monitor 60M, and the information collecting device 60I stores a computer program for realizing its function into its storage unit. In each of the TM control device 41, the brake control device 42, the engine control device 43, the ABS control device 44, the monitor 60M, and the information collecting device 60I, its processing unit reads the computer program necessary for control from its storage unit, and executes a command described in the read computer program. Thus, the devices mounted on the dump truck 10 are controlled.

A shift selector 46 is connected to the TM control device 41. The shift selector 46 designates a gear shift stage of the transmission 33 illustrated in FIG. 2. The shift selector 46 also designates a shift mode, when the transmission 33 automatically shifts a gear shift stage. In the second driving mode, the TM transmission device 41 controls the transmission 33 according to the control instruction from the second control system 50. A brake sensor 47A and a hoist sensor 47B are connected to the brake control device 42. The brake sensor 47A detects an operation amount of at least one of a retarder lever and a brake pedal mounted to the driver's room 11DR in the dump truck 10. The brake control device 42 controls a braking state of the brake 13B in the dump truck 10 based on the detected value of the brake sensor 47A. The brake control device 42 operates the brake 13B of the dump truck 10, when detecting the operation of the hoist lever by the hoist sensor 47B. The brake control device 42 also controls the brake 13B according to the control instruction from the second control system 50 in the second driving mode.

An accelerator opening detecting sensor 48 is connected to the engine control device 43. The accelerator opening detecting sensor 48 detects an operation amount of the accelerator pedal mounted to the driver's room 11DR of the dump truck 10. The engine control device 43 controls the engine 31 of the dump truck 10 based on the detected value of the accelerator opening detecting sensor 48. The engine control device 43 controls the engine 31 according to the control instruction from the second control system 50 in the second driving mode. The rotation sensor 15 (the front-wheel rotation sensor 15F and the rear-wheel rotation sensor 15R) is connected to the ABS control device 44. The ABS control device 44 controls the braking force of the brake 13B based on the detected value of the rotation sensor 15.

The front-wheel rotation sensor 15F includes a front-left-wheel rotation sensor 15FL that detects a rotating speed of the front-left wheel and a front-right-wheel rotation sensor 15FR that detects a rotating speed of the front-right wheel. The rear-wheel rotation sensor 15R includes a rear-leftwheel rotation sensor 15RL that detects a rotating speed of the rear-left wheel and a rear-right-wheel rotation sensor 15RR that detects a rotating speed of the rear-right wheel.

As illustrated in FIG. 3, the TM control device 41, the brake control device 42, the engine control device 43, the ABS control device 44, the monitor 60M, and the information collecting device 60I are electrically connected via a communication line 45. Thus, these devices can exchange information with one another via the communication line 45. For example, the TM control device 41, the brake control device 42, the engine control device 43, and the ABS control device 44 can acquire information of the other control devices or values detected by the sensors connected to the other control devices via the communication line 45, and use the acquired information for their own control.

In the present embodiment, the information collecting device 60I transmits overload information OPI to the TM control device 41 via the communication line 45. The TM control device 41 receiving the overload information OPI restricts the upper limit of the gear shift stage of the transmission 33 illustrated in FIG. 2 for preventing the speed of the dump truck 10 from excessively increasing. In the present embodiment, the TM control device 41 may output an instruction to restrict the engine speed of the engine 31 to the engine control device 43 via the communication line 45, instead of restricting the upper limit of the gear shift stage.

The information collecting device 60I transmits payload meter display information PMI to the monitor 60M via the communication line 45. The monitor 60M receiving the payload meter display information PMI displays the current load of the cargo by using the display information PMI. In the present embodiment, the monitor 60M and the engine control device 43 exchange information MTI relating to maintenance of the engine 31 illustrated in FIG. 2 via the communication line 45. Thus, the first control system 40 sends and receives information inside.

In the present embodiment, a CAN (Controller Area Network) is used for the communication in the first control system 40, more specifically, for the communication among the devices in the first control system 40. The communication line 45 is a wire harness forming the CAN. The communication in the first control system 40 is not limited to the CAN.

(Second Control System 50)

The second control system 50 includes, for example, a driving control device 51, an interface control device 52, a safety control device 53, a recording device 54, a peripheral monitoring device 55, and a driving monitoring device 58. The driving control device 51, the interface control device 52, the safety control device 53, the recording device 54, the peripheral monitoring device 55, and the driving monitoring device 58 are computers including a processing unit such as a CPU (Central Processing Unit) and a storage unit such as ROM (Read Only Memory).

The driving control device 51 acquires information, which is generated by the operation control device 2 for allowing the dump truck 10 to travel in the second driving mode, via the communication control device 19. The driving control device 51 controls the dump truck 10 via the first control system 40 based on the acquired information. Various sensors such as a gyro sensor 61, a speed sensor 62, a steering angle sensor 63, an acceleration sensor 64, the front-left-wheel rotation sensor 15FL, the front-right-wheel rotation sensor 15FR, the rear-left-wheel rotation sensor 15RL, and the rear-right-wheel rotation sensor 15RR are connected to the driving control device 51. The driving control device 51 acquires information detected by the above various sensors, and allows the dump truck 10 to automatically travel in the second driving mode.

The interface control device 52 is connected to the communication line 45 in the first control system 40 by a communication line 21. The interface control device 52 monitors the status of the first control system 40 via the communication line 21. The interface control device 52 also converts the information from the second control system 50 into a format (e.g., communication protocol conversion) understandable by the first control system 40, and transmits the converted information to the first control system 40. The interface control device 52 also converts the information from the first control system 40 into a format understandable by the second control system 50, and transmits the converted information to the second control system 50. In the present embodiment, the communication line 21 and the communication line 45 in the first control system 40 are different from each other. However, a common line can be used as both the communication line 21 and the communication line 45. The safety control device 53 controls a head lamp, an indicator, a horn, an engine starter, and a parking brake in the dump truck 10. The recording device 54 records the position of the dump truck 10 acquired from the GPS receiver 18B with a lapse of time, thereby recording the traveling route of the dump truck 10.

The communication line 21 is used for the communication between the first control system 40 and the second control system 50. In the present embodiment, a CAN is used for the communication between the first control system 40 and the second control system 50, for example. The communication line 21 is a wire harness forming the CAN. The communication between the first control system 40 and the second control system 50 is not limited to the CAN.

The peripheral monitoring device 55 includes a radar sensor and a laser sensor, for example, to detect an object ahead in the advancing direction of the dump truck 10 or an object around the dump truck 10. The driving control device 51 and the safety control device 53 operate the brake 13B, reduce the output from the engine 31, or turn the front wheels 13F, in the dump truck 10 based on the information of the object detected by the peripheral monitoring device 55, when the dump truck 10 travels in the second driving mode. In the case where an object is detected ahead of the dump truck 10 in the advancing direction, for example, the driving control device 51 operates the brake 13B of the dump truck 10 to decelerate the dump truck 10, stop the dump truck 10, or turns the front wheels 13F, to avoid the collision against the object. In the case where the peripheral monitoring device 55 detects that it grows dark, for example, the safety control device 53 turns on the head lamp of the dump truck 10.

The driving monitoring device 58 is connected to both the driving control device 51 and the safety control device 53 to send and receive information to and from these devices. The driving monitoring device 58 controls the first control system 40 to operate the brake 13B illustrated in FIG. 2 or to reduce the output from the engine 31, when the driving control device 51 loses its function, for example.

Each of the driving control device 51, the interface control device 52, the safety control device 53, and the driving monitoring device 58 stores a computer program for realizing its function into its storage unit. In each of the driving control device 51, the interface control device 52, the safety control device 53, and the driving monitoring device 58, its processing unit reads the computer program necessary for control from its storage unit, and executes a command described in the read computer program. Thus, these devices control the dump truck 10.

The driving control device 51, the interface control device 52, and the safety control device 53 are electrically connected via a communication line 56. Thus, these devices can exchange information with one another. For example, the driving control device 51, the interface control device 52, and the safety control device 53 can acquire information of the other control devices or values detected by the sensors connected to the other control devices via the communication line 56, and use the acquired information for their own control.

The communication line 56 is connected to the communication control device 19. The driving control device 51 acquires the information, which is transmitted from the operation control device 2 illustrated in FIG. 1 for allowing the dump truck 10 to automatically travel in the second driving mode, from the communication control device 19 via the communication line 56. The second control system 50 transmits the information relating to the status of the dump truck 10, which is now automatically traveling in the second driving mode, to the operation control device 2 via the communication line 56 and the communication control device 19. The TM control device 41, the engine control device 43, the brake control device 42, and the ABS control device 44 in the first control system 40 can acquire information detected by the various sensors, such as the gyro sensor 61 and the speed sensor 62, connected to the driving control device 51 in the second control system 50 via the communication line 56, the interface control device 52, the communication line 21, and the communication line 45.

The driving control device 51, the safety control device 53, the recording device 54, and the peripheral monitoring device 55 are electrically connected to one another via a communication line 57. With this, these devices can exchange information with one another. The driving control device 51, the interface control device 52, and the recording device 54 can acquire information that is detected by the peripheral monitoring device 55 and relates to an object around the dump truck 10 via the communication line 57, and use the acquired information for the control in the second driving mode.

The driving control device 51 generates an accelerator opening instruction ACO, a shift control instruction SLC, a brake instruction BRC, and a hoist instruction HOC, and transmits the generated instructions to the first control system 40 via the communication line 56, the interface control device 52, and the communication line 21. The engine control device 43 in the first control system 40 acquires the accelerator opening instruction ACO, and controls the output from the engine 31 illustrated in FIG. 2. The TM control device 41 in the first control system 40 acquires the shift control instruction SLC and the accelerator opening instruction ACO, and changes the gear shift stage of the transmission 33 illustrated in FIG. 2. The TM control device 41 acquires the accelerator opening instruction ACO detected by the accelerator opening detecting sensor 48 from the engine control device 43 in the first driving mode. The TM control device 41 acquires the accelerator opening instruction ACO generated by the driving control device 51 in the second control system 50 from the communication line 45 in the second driving mode. The brake control device 42 in the first control system 40 acquires the brake instruction BRC, and controls the brake 13B illustrated in FIG. 2. The brake control device 42 in the first control system 40 acquires the hoist instruction HOC, and operates the brake 13B when the vessel 12 illustrated in FIG. 2 is lifted, i.e., hoisted.

When automatically driving the dump truck 10 in the second driving mode, the driving control device 51 generates at least one of the accelerator opening instruction ACO, the shift control instruction SLC, the brake instruction BRC, and the hoist instruction HOC based on the information, which is acquired from the operation control device 2 for driving the dump truck 10 in the second driving mode. The driving control device 51 then controls the dump truck 10 via the first control system 40 with at least one of the accelerator opening instruction ACO, the shift control instruction SLC, the brake instruction BRC, and the hoist instruction HOC.

<Communication in Control System 20 in First Driving Mode and Second Driving Mode>

In the present embodiment, the dump truck 10 travels in both the first driving mode in which the operator drives the dump truck 10 and the second driving mode in which the second control system 50 illustrated in FIG. 3 allows the dump truck 10 to automatically travel in an unmanned state based on the information from the operation control device 2 illustrated in FIG. 1. In the first driving mode, the information necessary for the operation by the operator in the dump truck 10 and information necessary for executing control to restrict the driving operation of the operator are exchanged in the first control system 40.

When a lot of information is exchanged in the first control system 40 in the second driving mode, the information necessary for the second driving mode is supplied from the second control system 50 without decreasing the information exchanged in the first control system 40. Therefore, concentration of the communication is likely to occur on the communication line 45 in the first control system 40. This situation is likely to delay the timing on which the engine control device 43 and the brake control device 42 in the first control system 40 acquire the accelerator opening instruction ACO, the shift control instruction SLC, the brake instruction BRC, and the hoist instruction HOC, which are transmitted to the first control system 40 from the second control system 50. This situation is also likely to delay the timing on which the driving control device 51 in the second control system 50 acquires the information transmitted to the second control system 50 from the first control system 40.

In the present embodiment, the control system 20 controls such that, during the execution of the second driving mode, the number of types of information, which is exchanged by the communication in the first control system 40, becomes less that during the first driving mode, or the communication interval of the information exchanged in the first control system 40 becomes longer than that during the first driving mode. This control can prevent the occurrence of concentration of the communication on the communication line 45, whereby the delay of the information transmitting on the communication line 45 can be prevented. Consequently, the delay in the instruction to drive the dump truck in the second driving mode can be prevented, whereby the control by the control system 20 in the second driving mode can be stabilized. When the control system 20 controls such that, during the execution of the second driving mode, the communication interval of the information exchanged in the first control system 40 becomes longer than that during the first driving mode, the control system 20 preferably controls such that the communication interval of the information presented to the operator and the information relating to the control to restrict the operation by the operator becomes longer than that during the first driving mode.

When the concentration of communication occurs on the communication line 45 to cause a delay of the arrival of the information necessary for the second driving mode, the driving control device 51 stops the dump truck 10 via the driving control device 51. Therefore, productivity in a mine might be deteriorated. However, the control system 20 in the dump truck 10 controls such that, during the execution of the second driving mode, the number of types of information, which is exchanged by the communication in the first control system 40, becomes less than that during the first driving mode, or the communication interval of the information exchanged in the first control system 40 becomes longer than that during the first driving mode. Consequently, the delay in the instruction to drive the dump truck in the second driving mode can be prevented, whereby the possibility of stopping the dump truck 10 by the driving control device 51 is reduced. Accordingly, the deterioration in the productivity in a mine can be prevented.

During the execution of the second driving mode, the control system 20 controls to stop the transmission of some of or all of the information presented to the operator in the first driving mode, the information for executing the control to restrict the operation by the operator, and information belonging to information to be presented during the maintenance, or to increase the communication interval. In this case, the control system 20 preferably stops the exchange of the information presented to the operator and the information relating to the control to restrict the operation by the operator, among the information pieces exchanged by the communication in the first control system 40. Next, a procedure of a control method for the work vehicle according to the present embodiment will be described.

<Control Method for Work Vehicle>

Figure 4:
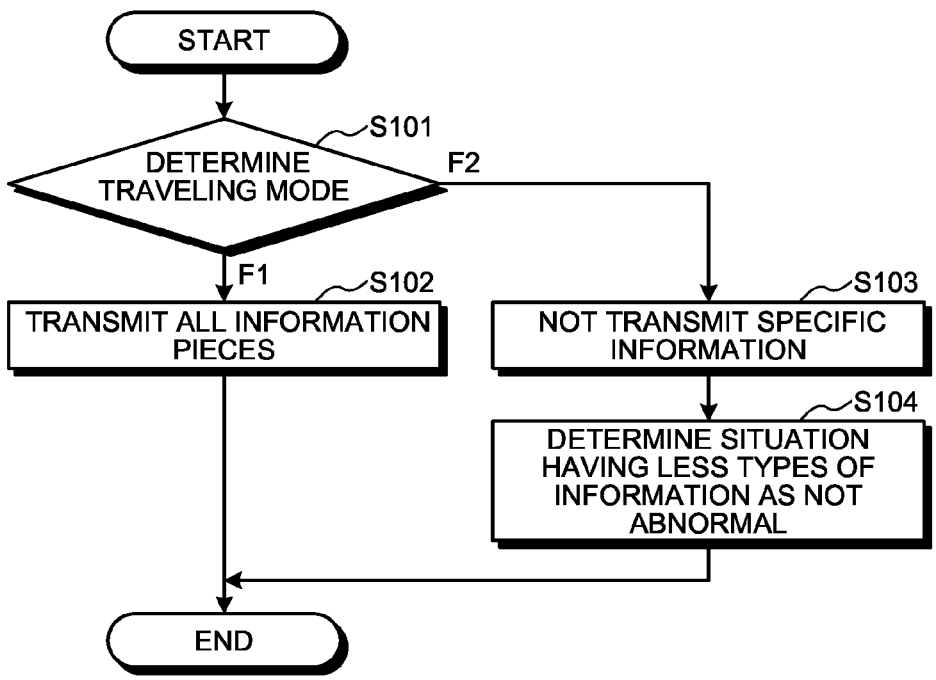
FIG. 4 is a flowchart illustrating a procedure of executing a control method for the work vehicle according to the present embodiment.

FIG. 4 is a flowchart illustrating the procedure upon executing the control method for the work vehicle according to the present embodiment. The control method for the work vehicle according to the present embodiment is executed by the control system 20 illustrated in FIG. 3. In step S101, the first control system 40 determines a driving mode of the dump truck 10. The driving mode can be determined based on the position of the key switch 60K illustrated in FIG. 3. Specifically, if the key switch 60K selects the first driving mode, the first control system 40 determines that the driving mode is the first driving mode, and if the key switch 60K selects the second driving mode, the first control system 40 determines that the driving mode is the second driving mode.

When the dump truck 10 travels in the first driving mode (F1 in step S101), the first control system 40 transmits all information pieces in step S102. Specifically, in the first control system 40, the information necessary for controlling the traveling of the dump truck 10 as well as the information presented to the operator, the information for executing the control to restrict the driving operation by the operator, and the information belonging to the information presented upon the maintenance are transmitted to the communication line 45. In other words, the TM control device 41, the brake control device 42, the engine control device 43, the ABS control device 44, the monitor 60M, and the information collecting device 60I in the first control system 40 output all information pieces, which are the information necessary for controlling the traveling of the dump truck 10, the information presented to the operator, the information for executing the control to restrict the driving operation by the operator, and the information belonging to the information presented upon the maintenance, to the communication line 45.

When the dump truck 10 travels in the second driving mode (F2 in step S101), the first control system 40 does not transmit specific information to the communication line 45 in step S103. The specific information includes the information presented to the operator in the first driving mode, the information for executing the control to restrict the driving operation by the operator, and the information belonging to the information presented upon the maintenance, as described above. In the second driving mode, these information pieces are not transmitted to the communication line 45 in the first control system 40.

The TM control device 41, the brake control device 42, the engine control device 43, the ABS control device 44, the monitor 60M, and the information collecting device 60I in the first control system 40 do not output the specific information to the communication line 45, when the key switch 60K selects the second driving mode. All of the specific information pieces, which include the information presented to the operator in the first driving mode, the information for executing the control to restrict the driving operation by the operator, and the information belonging to the information presented upon the maintenance, are preferably not transmitted to the communication line 45 during the execution of the second driving mode. However, some of these information pieces may not be transmitted to the communication line 45.

The information presented to the operator in the first driving mode includes information displayed on the monitor 60M in the first driving mode. This information is, for example, a current load capacity, a rated load, a stop signal, a drive signal, a vehicle status, a count stop time, and a counting period. The current load capacity is also the information for executing the control to restrict the driving operation by the operator. The information belonging to the information presented upon the maintenance is, for example, the engine speed of the engine 31 upon cranking with no fuel injected during the maintenance of the engine 31.

When the information used in the first control system 40 is not transmitted to the communication line 45 during the execution of the first driving mode, the monitor 60M illustrated in FIG. 3 determines the situation, in which the information is not transmitted, to be abnormal, and displays that abnormality occurs. Specifically, when the number of types of information exchanged by the communication in the first control system 40 is decreased, the control system 20 determines this situation to be abnormal. In the present embodiment, the first control system 40 controls such that the number of types of information exchanged by the communication in the first control system 40 during the execution of the second driving mode becomes less than that during the first driving mode. Therefore, the number of types of information exchanged by the communication in the first control system 40 is reduced. This is not abnormal in the first control system 40, and the control system 20 normally operates as a whole.

When the number of types of information exchanged by the communication in the first control system 40 is reduced because the first control system 40 does not transmit specific information to the communication line 45 during the execution of the second driving mode (step S103), the control system 20 determines this situation to be normal (step S104). The monitor 60M does not display the situation in which information is missing as an abnormal situation. The information collecting device 60I does not transmit information indicating that abnormality occurs to the operation control device 2 illustrated in FIG. 1. According to this configuration, the decrease in the number of types of information used in the first control system 40 in the case where the dump truck 10 travels in the second driving mode is not recognized as an abnormal situation, whereby an occurrence of unnecessary information indicating abnormality can be prevented.

In the present embodiment, the first control system 40 may control such that, during the execution of the second driving mode, the communication interval of at least one of the information presented to the operator, the information relating to the control to restrict the operation by the operator, and the information belonging to the information presented during maintenance becomes longer than that during the first driving mode. Control for increasing the communication interval will next be described as a control method for a work vehicle according to a modification of the present embodiment.

(Control Method for Work Vehicle According to Modification of Present Embodiment)

Figure 5:
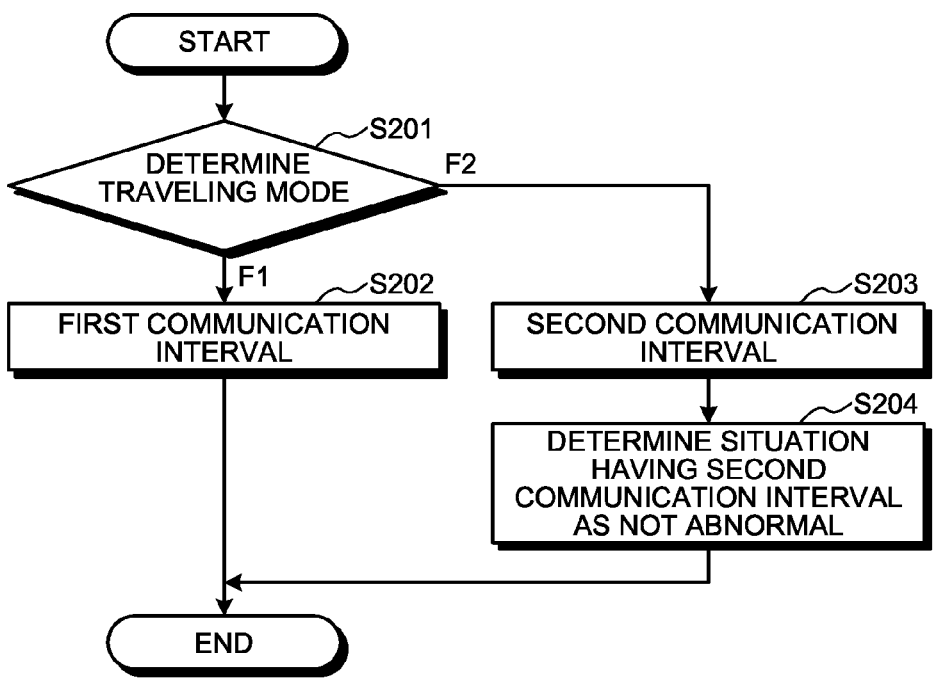
FIG. 5 is a flowchart illustrating a procedure of executing a control method for a work vehicle according to a modification of the present embodiment.

FIG. 5 is a flowchart illustrating a procedure upon executing a control method for a work vehicle according to a modification of the present embodiment. The control method for a work vehicle according to the present embodiment is executed by the control system 20 illustrated in FIG. 3. In step S201, the first control system 40 determines a driving mode of the dump truck 10. The driving mode can be determined based on the position of the key switch 60K illustrated in FIG. 3. Specifically, if the key switch 60K selects the first driving mode, the first control system 40 determines that the first driving mode is selected, and if the key switch 60K selects the second driving mode, the first control system 40 determines that the second driving mode is selected.

When the dump truck 10 travels in the first driving mode (F1 in step S201), the first control system 40 transmits all information pieces with a first communication interval in step S202. Specifically, in the first control system 40, the information necessary for controlling the traveling of the dump truck 10, the information presented to the operator, the information for executing the control to restrict the driving operation by the operator, and the information belonging to the information presented during the maintenance are transmitted to the communication line 45 with the first communication interval. In other words, the TM control device 41, the brake control device 42, the engine control device 43, the ABS control device 44, the monitor 60M, and the information collecting device 60I in the first control system 40 output all of the information necessary for controlling the traveling of the dump truck 10, the information presented to the operator, the information for executing the control to restrict the driving operation by the operator, and the information belonging to the information presented during the maintenance to the communication line 45 with the first communication interval.

When the dump truck 10 travels in the second driving mode (F2 in step S201), the first control system 40 transmits specific information with a second communication interval longer than the first communication interval in step S203. The specific information is at least one of the information presented to the operator, the information for executing the control to restrict the driving operation by the operator, and the information belonging to the information presented during the maintenance as described above. In step S203, the first control system 40 transmits the specific information with the second communication interval, whereby the specific information is transmitted more intermittently than in the case of transmitting the information with the first communication interval. The control system 20 determines in step S204 that the situation in which the specific information is transmitted with the second communication interval is not a communication abnormality.

In the present modification, the control system 20 controls such that, during the execution of the second driving mode, the communication interval of the information exchanged by the communication in the first control system 40 becomes longer than that during the first driving mode, as described above. Consequently, the delay in the instruction to drive the dump truck in the second driving mode is prevented, whereby the possibility to stop the dump truck 10 by the driving control device 51 is reduced. Accordingly, the deterioration in productivity in a mine can be prevented.

The present embodiment describes a method of switching between the first driving mode and the second driving mode by using the key switch 60K. However, the method of switching between the first driving mode and the second driving mode is not limited to the one using the key switch 60K. For example, the driving control device 51 may include a changeover switch to determine that the driving mode is the first driving mode or the second driving mode based on a signal from the changeover switch, and select the determined driving mode. The driving control device 51 may also use information relating to the status of the dump truck 10, such as parking brake information, in addition to the signal from the above changeover switch, to determine that the driving mode is the first driving mode or the second driving mode, and select the determined driving mode.

The present embodiment describes, as one example, a work vehicle that travels in an unmanned state based on the information acquired by external communication in the second driving mode. However, the work vehicle may automatically travel based on information of traveling data (e.g., traveling route data or speed data) stored beforehand in a system in the work vehicle by an operator.

The present embodiment describes the case where the second control system 50 used for the unmanned traveling is provided in isolation from the first control system 40. However, a control system formed by combining the first control system 40 and the second control system 50 may be used.

While a certain embodiment has been described, the above description is not intended to limit the scope of the present embodiment. The components described above include those easily considered by a person skilled in the art, those substantially the same, and their equivalents. The above components can appropriately be combined. Furthermore, various omissions, substitutions, or modifications may be made without departing from the spirit of the present embodiment.

REFERENCE SIGNS LIST

1 UNMANNED DUMP OPERATION SYSTEM
2 OPERATION CONTROL DEVICE
10 DUMP TRUCK
11 VEHICLE BODY
12 VESSEL
13B BRAKE
13F FRONT WHEEL
13R REAR WHEEL
19 COMMUNICATION CONTROL DEVICE
19S COMMUNICATION DEVICE
20 CONTROL SYSTEM
21 COMMUNICATION LINE
30 DRIVE DEVICE

31 ENGINE
40 FIRST CONTROL SYSTEM
41 TM CONTROL DEVICE
42 BRAKE CONTROL DEVICE
43 ENGINE CONTROL DEVICE
44 ABS CONTROL DEVICE
45 COMMUNICATION LINE
50 SECOND CONTROL SYSTEM
51 DRIVING CONTROL DEVICE
52 INTERFACE CONTROL DEVICE
53 SAFETY CONTROL DEVICE
54 RECORDING DEVICE
55 PERIPHERAL MONITORING DEVICE
56, 57 COMMUNICATION LINE
58 DRIVING MONITORING DEVICE
60I INFORMATION COLLECTING DEVICE
60K KEY SWITCH
60M MONITOR

The invention claimed is:

1. A work vehicle, comprising:
a control system, wherein
the control system includes:
   a communication device that is provided to the work vehicle to acquire information through communication with an outside of the work vehicle,
   a first control system that includes one or more first processors from a plurality of processors, and allows the work vehicle to travel in the first driving mode based on an operation by an operator on-board the work vehicle,
   a second control system that includes one or more second processors from the plurality of processors, generates a control instruction to control the work vehicle based on the information acquired from the communication device, and transmits the control instruction to the first control system to allow the work vehicle to travel in the second driving mode via the first control system, and
   a communication line used for a communication between the first control system and the second control system,
   wherein the control system, including the plurality of processors, is configured to:
      control at least one of an engine, a transmission or a brake,
      switch between the first driving mode for allowing the work vehicle to travel in a manned state and the second driving mode for allowing the work vehicle to travel in an unmanned state, and
      control information pieces that are exchanged by communication in the control system, all of the information pieces being communicated in the first control system over a first communication interval during execution of the first driving mode, and only some of all of the information pieces being communicated in the first control system over a second communication interval during execution of the second driving mode, the second communication interval being longer than the first communication interval, wherein the some of the information pieces are stopped from being communicated in the first control system during execution of the second driving mode, and the stopped information pieces including at least one of an information presented to the operator, an information relating to control to restrict the operation by the operator, and an information belonging to information presented during maintenance of the work vehicle.

2. The work vehicle according to claim 1, wherein
when the control system determines an abnormal situation during the execution of the first driving mode, the information pieces exchanged by the communication in the control system is decreased, and
when the control system does not determine an abnormal situation during the execution of the second driving mode, the information pieces exchanged by the communication in the control system is decreased.

3. The work vehicle according to claim 1, wherein the first control system includes an engine control device, a transmission control device, a brake control device and an ABS control device and is connected to a second communication line, the control system controlling such that the information pieces are exchanged by communication in the first control system via the second communication line.

4. A work vehicle, the work vehicle comprising:
a communication device that is provided to the work vehicle to acquire information through communication with an outside of the work vehicle;
a changeover switch that switches between a first driving mode for allowing the work vehicle to travel in a manned state and a second driving mode for allowing the work vehicle to travel in an unmanned state;
a first control system that includes one or more first processors, and allows the work vehicle to travel in the first driving mode based on an operation by an operator on-board the work vehicle, the first control system controlling at least one of an engine, a transmission or a brake;
a second control system that includes one or more second processors, generates a control instruction to control the work vehicle based on the information acquired from the communication device, and transmits the control instruction to the first control system to allow the work vehicle to travel in the second driving mode via the first control system; and
a communication system used for a communication between the first control system and the second control system, wherein
the first control system determines the first driving mode and the second driving mode by the changeover switch, and controls information pieces that are exchanged by communication in the first control system, all of the information pieces being communicated in the first control system over a first communication interval during execution of the first driving mode, and only some of all of the information pieces being communicated in the first control system over a second communication interval during execution of the second driving mode, the second communication interval being longer than the first communication interval, wherein the some of the information pieces are stopped from being communicated in the first control system during execution of the second driving mode, the stopped information pieces including at least one of an information presented to the operator, an information relating to control to restrict the operation by the operator, and an information belonging to information presented during maintenance of the work vehicle.

5. A control method for a work vehicle, the method comprising:
switching between a first driving mode for allowing the work vehicle to travel in a manned state and a second driving mode for allowing the work vehicle to travel in an unmanned state;
acquiring information through communication, via a communication device, with an outside of the work vehicle;
allowing the work vehicle, via a first control system that includes one or more first processor, to travel in the first driving mode based on an operation by an operator on-board the work vehicle, generating a control instruction, via a second control system that includes one or more second processor, to control the work vehicle based on the information acquired from the communication device, and transmitting the control instruction to the first control system to allow the work vehicle to travel in the second driving mode via the first control system;

using a communication system for communication between the first control system and the second control system;

controlling all of information pieces being communicated in the first control system over a first communication interval during execution of the first driving mode, and only some of all of the information pieces being communicated in the first control system over a second communication interval during execution of the second driving mode, the second communication interval being longer than the first communication interval, wherein the some of the information pieces are stopped from being communicated in the first control system during execution of the second driving mode, the stopped information pieces including at least one of an information presented to the operator, an information relating to control to restrict the operation by the operator, and an information belonging to information presented during maintenance of the work vehicle.

* * * * *